June 22, 1965 R. S. FARR ETAL 3,190,058
CYLINDRICAL DUST-SEPARATING DEVICE
Filed Oct. 3, 1961 3 Sheets-Sheet 1
FIG. I.
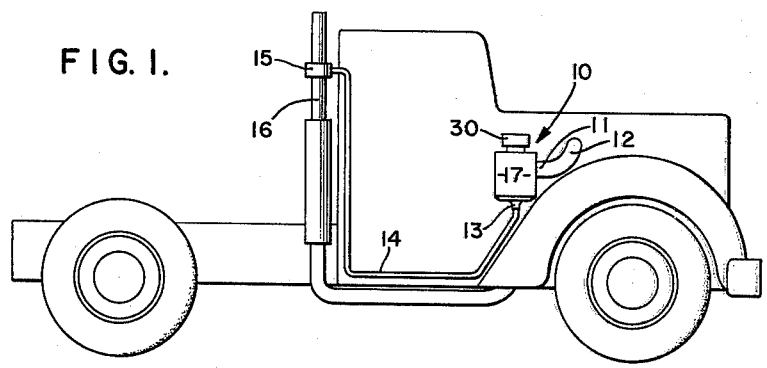
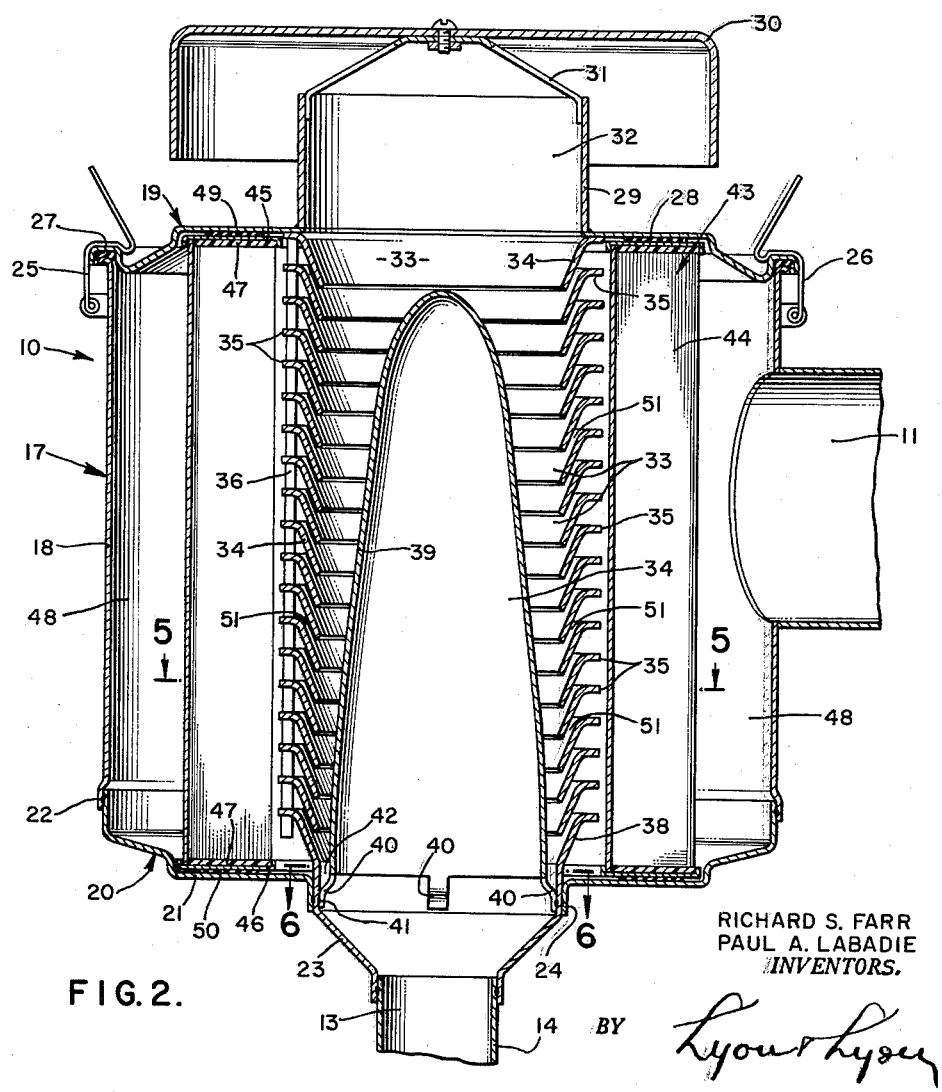
FIG. 2.
RICHARD S. FARR
PAUL A. LABADIE
INVENTORS.
BY Lyon & Lyon
ATTORNEYS.

June 22, 1965 R. S. FARR ETAL 3,190,058
CYLINDRICAL DUST-SEPARATING DEVICE
Filed Oct. 3, 1961 3 Sheets-Sheet 2

RICHARD S. FARR
PAUL A. LABADIE
*INVENTORS.*

BY

ATTORNEYS.

RICHARD S. FARR
PAUL A. LABADIE
INVENTORS.

United States Patent Office 3,190,058
Patented June 22, 1965

3,190,058
CYLINDRICAL DUST-SEPARATING DEVICE
Richard S. Farr, Los Angeles, and Paul A. Labadie, Redondo Beach, Calif., assignors to Farr Company, El Segundo, Calif., a corporation of California
Filed Oct. 3, 1961, Ser. No. 142,675
4 Claims. (Cl. 55—325)

This invention relates to an air filter or cleaner for use on an internal combustion engine or other apparatus requiring a supply of clean air and, in particular, is related to an air cleaner adapted for use in filtering air containing a large amount of foreign material without the air cleaner requiring repetitious servicing and maintenance while operating under these conditions.

Internal combustion engines and various other apparatus require that the intake air be relatively clean and free from foreign material such as dirt and dust. There are various conventional cleaners for this purpose such as the oil bath filter or simple filter provided with a fine mesh filtering element to extract the dust and dirt from the air passing therethrough. Each of the conventional air cleaners or filters has the inherent deficiency that when operated in extremely dusty or dirty locations, the filtering element or media becomes extremely dirty and clogged so that repeated cleaning or replacement is necessary. This extremely dusty and dirty air condition has been found to be a substantial problem in the operation of earth moving and digging equipment where dust and dirt particles are continually present and highly concentrated in the air available for the engine intakes. An air cleaner to be practical under such conditions must be adapted to filter a great amount of dust from the air without clogging or becoming ineffective and without requiring repeated servicing or maintenance.

The development of relatively inexpensive paper filters has led to the commercial acceptance and use of various forms of replaceable type paper filter element air cleaners. Effective filtering has been experienced, but under extremely dusty air conditions, the paper filter readily becomes clogged and ineffective thus requiring repeated replacement.

It has been found advantageous in many filtering installations to employ two stage cleaning of the air. The air is first subjected to a precleaner which removes a majority of the foreign material, or at least the larger particles, and then the air passes through a finish filtering stage adapted to produce the desired quality of filtered air for consumption. The precleaner preferably is of such a construction that it is capable of removing large quantities of foreign material without becoming clogged or ineffective and also without requiring continual maintenance. The finish filtering stage, however, may employ replaceable filtering elements such as paper filters if the air coming from the precleaner is sufficiently filtered so as to not cause clogging of the replaceable filter element at too fast a rate. Rapid clogging of the replaceable filter element would defeat the objective attempted to be accomplished by the precleaner. It is therefore apparent that for a two stage cleaner to be practical the precleaner must be relatively efficient in removing foreign material from the air.

For economy and practicality a filtering device for mobile vehicles must be relatively small and rugged. A large air cleaner may be highly efficient and effective but completely unusable on a vehicle due to space considerations. Also, an air cleaner must be able to withstand the vibrations and shocks inherent in the operation of a vehicle having an internal combustion engine.

In accordance with the present invention, there is provided an air filtering or cleaning device which separates and removes a large portion of the foreign material present in the intake air before the air reaches a filtering element.

Accordingly, it is an object of this invention to provide a dust-separating device which is provided with novel means for separating a major portion of the dust from the intake air and continually discharging that dust from the device while the air is further filtered before entering the intake of the appropriate engine or apparatus.

Another object of this invention is to provide a novel form of dust-separating device which is relatively small in size and provides a novel form of precleaner as an initial separating stage and is adapted to be combined with a replaceable filtering element to effect a two stage cleaning of the intake air.

A further object of this invention is to provide an air cleaner for internal combustion engines or the like wherein the majority of dust or foreign material extracted from the air is continually removed from the cleaner through a bleed-off passage by use of a negative pressure or suction created by an aspirator associated with the exhaust of the internal combustion engine or the like.

Another object of this invention is to provide a cylindrical air filtering or cleaning device which includes an initial dust-separating means requiring no maintenance or servicing as well as a replaceable filter element for secondary filtering.

A specific object of this invention is to provide a relatively small air cleaner which is capable of separating and filtering a relatively large quantity of dust from intake air without requiring repeated maintenance, servicing or replacement.

A further and more detailed object of this invention is to provide a cylindrical dust-separating device wherein a relatively large dust separating and filtering area is provided and which is efficiently and uniformly utilized for the relatively small space occupied by the device.

Other and more detailed objects and advantages of this invention will appear from the following description in the accompanying drawings.

In the drawings:

FIGURE 1 is a diagrammatic elevation of a truck showing the device of this invention installed thereon.

FIGURE 2 is a sectional elevation of the device of this invention taken through the central vertical axis thereof.

Figure 3:
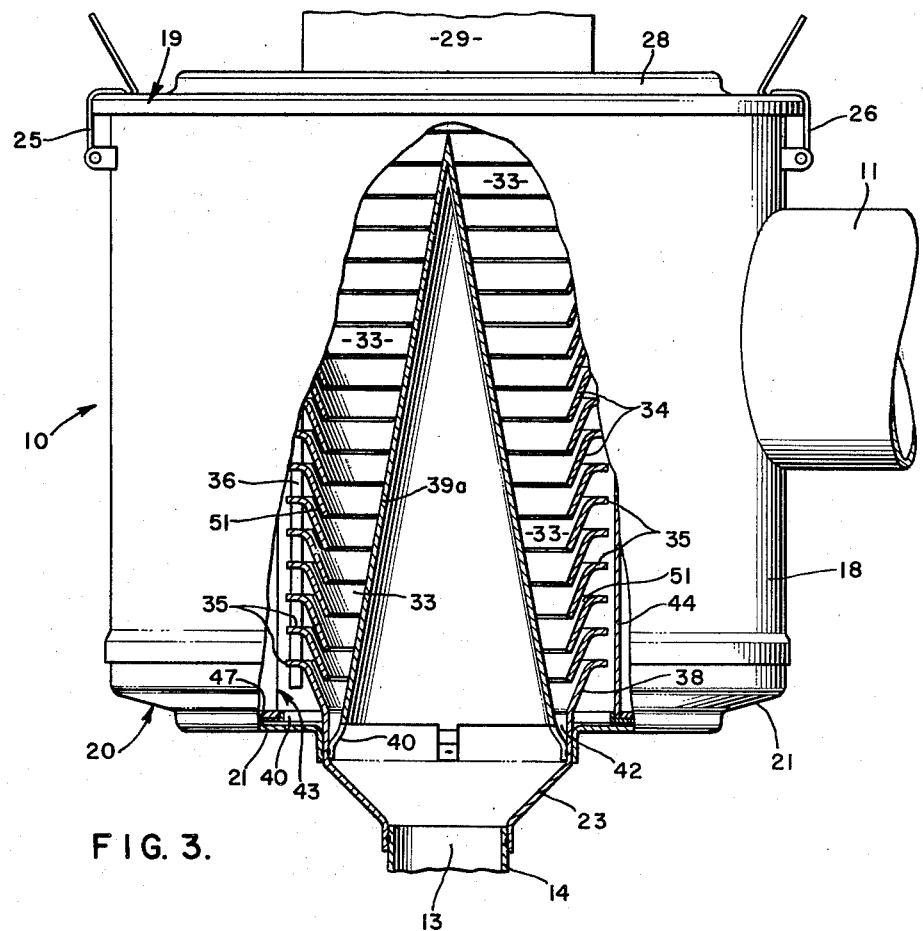
FIGURE 3 is an elevation of a modified form of this invention with a portion shown in section similar to FIGURE 2 for illustrating the modification.

Referring now to the drawings, the air cleaner of this invention, generally designated 10, is mounted on a truck or other apparatus using an internal combustion engine or similar device requiring filtered air. The cleaner 10 has an outlet opening 11 attached to the intake 12 of the internal combustion engine for supplying filtered air from the cleaner to the engine. The cleaner 10 has a second outlet opening 13 attached by means of a conduit 14 to an aspirator 15 associated with the exhaust pipe 16 of the internal combustion engine. While the engine is running, the air supplied for the engine is drawn through the intake 12 and the exhaust is discharged through the exhaust pipe 16. A negative pressure or suction is created in the conduit 14 due to the functioning of the aspirator 15. It is not essential to this invention that the negative pressure in the conduit 14 be created by an aspirator attached to the exhaust of the engine but rather any appropriate means could be provided which would maintain this negative pressure or suction during the operation of the engine, except that intake manifold vacuum cannot be used directly since the air drawn through conduit 14 will contain foreign material and should not be discharge into the intake of the engine. We prefer, however, to use the kinetic energy developed by the exhaust gases dispelled through exhaust pipe 16 to create this negative pressure in conduit 14 rather than providing a separate suction fan or pump which necessarily would be operated by some separate, power-consuming means.

The housing 17 of the air cleaner is comprised of a generally cylindrical wall 18, an upper end assembly 19 and a lower end assembly 20. The lower end assembly 20 has a flange portion 21 connected to the cylindrical wall 18 by any convenient means such as weld 22 and a neck portion 23 joined to the flange portion 21 by any convenient means such as weld 24. The lower portion of the neck 23 forms the outlet opening 13 and is adapted to be attached to the conduit 14 in the final assembly.

The upper end assembly 19 is removably mounted on the upper end of the cylindrical wall 18 by any convenient means such as spring clips 25 and 26. A gasket 27 of appropriate material is provided for effecting a seal between the cylindrical wall 18 and the upper end assembly 19. The assembly 19 is comprised of a flange member 28 connected to a sleeve 29 which extends upward and is surmounted by a cap 30. The cap 30 is appropriately mounted on the sleeve 29 by bracket 31 to permit air to be drawn in under the lower edge of the cap and downward through the sleeve 29 which forms an inlet opening 32 to the housing. The cap 30 merely serves to prevent large objects or rain from entering the inlet opening 32.

Figure 7:
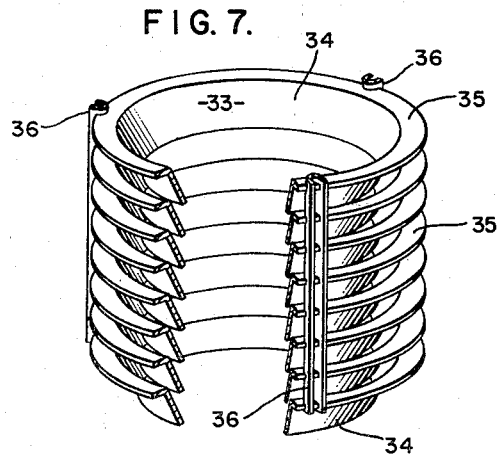
FIGURE 7 is a perspective elevation view, with a portion broken away in section for clarity, of a portion of the initial dust-separating means of the device.
Figure 8:
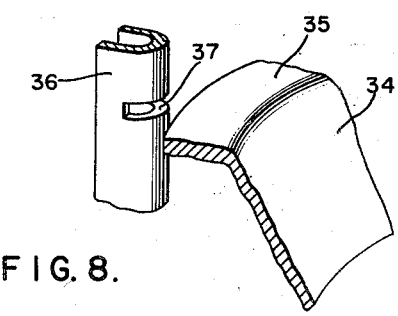
FIGURE 8 is a fragmentary perspective view showing the parts illustrated in FIGURE 7 before assembly.

In order to make practical use of the replaceable filter element, hereinafter described, some of the foreign material must be separated from the air before the air reaches that filter element. Precleaner means are provided for using the downward inertia of the dust and dirt particles for separating same from the flowing air by sharply changing the direction of the flow of the incoming air from downward through the center of the housing to upwardly and outwardly toward the cylindrical wall 18 of the housing and, as shown in the drawings, these means may include a plurality of vane members 33 generally annular in shape and vertical spaced one from the other. Each vane 33 is provided with a frusto-conical flange portion 34 which extends downwardly and inwardly within the housing and a radial flange portion 35 extending outwardly from the upper end of the conical flange portion 34. The vane members 33 are mounted within the housing 17, concentric therewith, by any convenient means such as struts 36. Although as shown in FIGURE 7, three struts may be used, it is to be understood that any convenient number of struts or other means could be used which would give adequate structural support and proper alignment and spacing to the plurality of vanes 33. Each strut 36 is generally channel shaped and is provided with a plurality of slots 37 adapted to receive the radial flange 35 of each vane 33. The vane 33 can be secured to the struct 36 by any convenient means such as welding thereto or crimping the portion of the flange 35 which extends through the slot 37.

The upper portion 38 of the neck 23 forms the lowermost vane member and is also attached to the struts 36 for supporting the vanes 33 within the housing.

A plug member 39 is mounted within the housing concentric therewith and concentric with the annular shaped vanes 33. The plug 39 serves to progressively reduce the cross section of the flow passage down the center of the housing for purposes hereinafter described. The plug 39 is supported in the housing by a plurality of tabs 40 extending downwardly and outwardly from the lower end of the plug and secured to the neck portion 23 of the lower end assembly 20 by any convenient means such as weld 41. The outside surface of the lower end of the plug 39 has a diameter less than the inside diameter of the neck portion 23 adjacent thereto thereby forming an annular slot or opening 42 between the plug 39 and the neck portion 23. This annular slot 42 communicates directly with the outlet opening 13 for effecting the removal of dust and foreign material from within the housing.

A removal and replaceable filter cartridge 43 is adapted to be mounted in the housing 17 and surrounds the vanes 33. The cartridge 43 may be of any conventional type capable of a relatively high efficiency in removing dust and foreign material from the air drawn through the cartridge and, as shown in the drawings, we prefer to use a cartridge having a vertically corrugated paper filter element 44 with is formed into a generally cylindrical shape and capped on either end by rings 45 and 46 secured to the paper by any convenient means such as glue 47. The relative radial dimensions of the cartridge 43 and the housing cylindrical wall 18 are such as to provide a substantial annular space 48 between the cartridge and the wall whereby filtered air may circulate between the wall and the cartridge to the outlet opening 11, thus utilizing the full circumference of the filter element. As is well known to one versed in the art, the vertical corrugations of the paper filter element provide both structural strength and increased usable filtering area.

A pair of gaskets 49 and 50 are provided for sealing of the rings 45 and 46, respectively, to the upper and lower end assemblies 19 and 20, respectively, whereby all of the air flowing from the vanes 33 to the annular space 48 must flow through the filter element 44.

In the operation of the air cleaner 10, the internal combustion engine or other apparatus draws air through the intake manifold 12 from the outlet opening 11 in the cylindrical wall 18 of the housing 17. This intake air is drawn through the inlet opening 32, past the vanes 33, through the filter element 44, into the annular space 48 and then to the outlet opening 11. The vanes 33 are vertically spaced as heretofore described to form relatively narrow annular passages 51 between the flanges 34 of adjacent vanes 33. Since the flanges 34 are generally the shape of a truncated cone and each of the vanes are substantially the same, the passages 51 are substantially uniform in cross sectional area and extend generally upwardly and outwardly from the center of the housing. As the air is drawn downward from the inlet opening 32, a small portion of the air is drawn through each of the passages 51 and in so doing sharply reverses the direction of flow of that small portion of air. The momentum of each of the individual particles of dust present in the incoming air tends to cause each particle of dust to be discharged downwardly from the air, due to the inertia of each particle, as the air reverses direction and flows upwardly in the passages 51. The velocity of the air flowing upward through the passages 51 is sharply reduced from the velocity of the downwardly flowing incoming air due to the large difference in the cross sectional area of the inlet 32 compared to the aggregate of areas of all of the passages 51. The deceleration also tends to drop the dust particles from the flowing air before the particles can flow all the way through the passages 51. A plug 39 extends substantially the full height of the plurality of openings to all the passages 51. The plug 39, in effect, progressively reduces the horizontal cross sectional size of the inlet opening for the air flowing downwardly in the housing. This progressive reduction in opening assures a relatively high downward velocity past the openings of every passage 51 even though some air is drawn through each passage which normally would result in a very low velocity past the lower vanes. This retention of a relatively high velocity past the lower vanes makes effective use of the lower vanes and passages as initial dust separators as well as the upper vanes and passages where the air velocity is greatest.

The annular slot 42 is relatively small compared to the sum of the areas of the openings to passages 51 so that a relatively small percentage of the inlet air is drawn through slot 42 to be discharged through conduit 14. It has been found practical and effective to have sizes of the passages 51, slot 42, outlet 13 and outlet 11 and the magnitude of the negative pressures in conduit 14 and the intake 12 all related to each other such that approximately 10% of the incoming air passes through slot 42 and out conduit 14 and the remaining approximately 90% of the incoming air passes through outlet 11 to the engine. By this relationship sufficient velocities are maintained adjacent the openings to the lowermost passages 51 so that effective initial separation of the dust from 90% of the flowing air is accomplished. The 10% of the incoming air which is drawn through slot 42 has been found sufficient to carry the dust inertially separated from the air flowing through the passage 51 out of the housing through conduit 14 and back out to the atmosphere, thus keeping the interior of the housing relatively unclogged and free of dust.

The radial flanges 35 of the vanes 33 serve to deflect the air passing upwardly and outwardly through the passages 51 to substantially a radial direction before the air impinges upon the filter element 44, thereby distributing the flow of air more uniformly over the inside of the filter element. After extended use when the inside surface of the filter element 44 becomes objectionably clogged with dust and other foreign material, the upper end assembly 19 may be removed by releasing the clips 25 and 26 to permit removal and replacement of the filter cartridge 43.

We prefer to make the plug 39 in the shape of approximately the surface of revolution of a parabola as illustrated in FIGURE 2. This configuration results in a relatively uniform deceleration of the air between the inlet 32 and the annular slot 42 thereby resulting in relatively uniform inertial dust separation efficiency throughout the height of the device. As shown in FIGURE 3, the plug 39a could take the shape of a simple cone extending from the opening of the lowermost passage 51 to the opening of the uppermost passage 51. It is to be understood that various other shapes of plugs could be positioned within the housing to accomplish the desired velocities or volumetric capacities of a particular installation.

Figure 4:
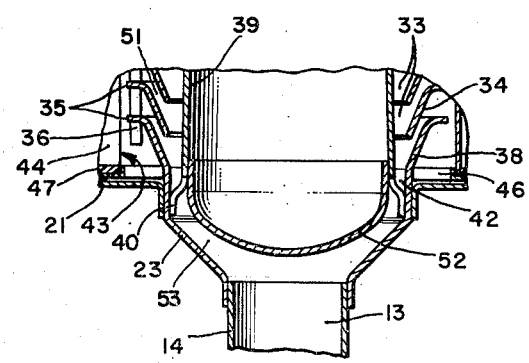
FIGURE 4 is a fragmentary elevation view showing a second modification of this invention adaptable to either the preferred form shown in FIGURE 2 or the modification shown in FIGURE 3.
Figure 5:
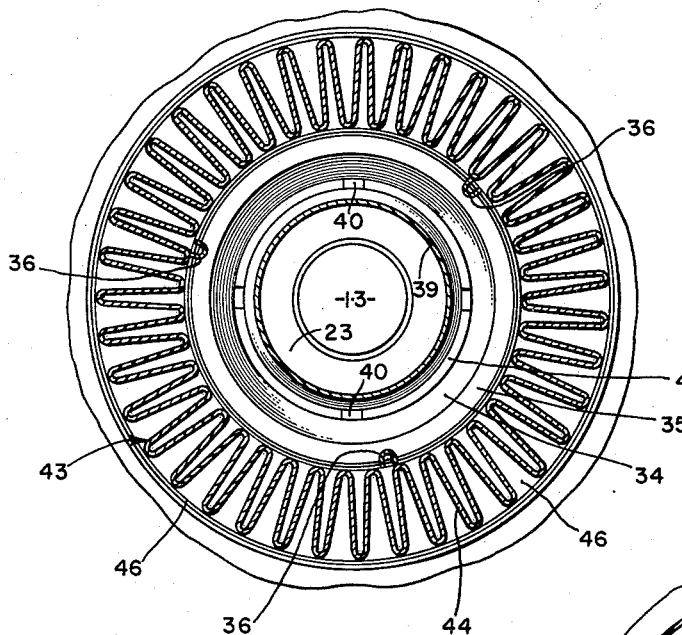
FIGURE 5 is a sectional plan view taken substantially on the line 5—5 as shown in FIGURE 2.
Figure 6:
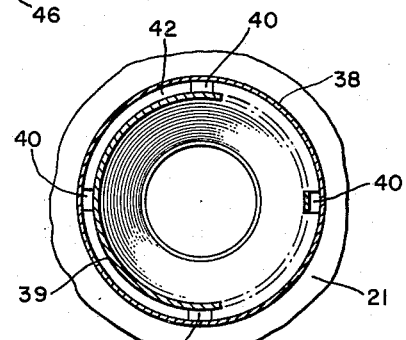
FIGURE 6 is a fragmentary sectional plan view taken substantially on the line 6—6 as shown in FIGURE 2.

FIGURE 4 illustrates a modification adapted for use with either the preferred embodiment illustrated in FIGURE 2 or the modified form illustrated in FIGURE 3. The cap 52 is secured to the lower end of the plug 39 or 39a and serves to control the size and shape of the opening extending between the slot 42 and the conduit 14. It has been found that by controlling the expansion of the air as it flows from slot 42 to conduit 14 turbulence is reduced and a more effective bleeding-off of air and dust through slot 42 may be accomplished. The annular passage 53 formed between the cap 52 and the neck portion 23 increases in size with the direction of flow of the air, thereby controlling the expansion of the air and reducing turbulence.

Having fully described our invention, it is to be understood that we do not wish to be limited to the details herein set forth or to the details illustrated in the drawings, but our invention is of the full scope of the appended claims.

We claim:

1. In an air filtering device for use with an internral combustion engine or the like having intake means for drawing filtered air from the device and also having suction means for drawing from the device some unfiltered air and foreign material filtered out of the flowing air, the combination of: a generally cylindrical housing having a vertical axis and cylindrical wall, said housing having an upper end and a lower end joined to said wall, the said upper end having an air inlet opening substantially concentric with said housing, first annular means concentrically mounted within said housing for changing the direction of air flow from downwardly from said inlet to radially outwardly and upwardly in said housing whereby foreign material is inertially discharged from the flowing air, said first means including a plurality of vertically spaced annular vane members positioned concentrically with said housing, each vane member having a downwardly and inwardly extending flange, the said lower end of the housing having an annular outlet positioned immediately adjacent and radially inwardly from said vane members and in communication with said inlet, imperforate means extending downwardly from said annular outlet for defining a passageway of increasing cross-sectional area for controlled expansion of air therein, said outlet being adapted to communicate with the suction means through said passageway whereby the discharged foreign material and some air is drawn from said housing through said outlet and said passageway, second annular means concentrically mounted in said housing between said first means and said cylindrial wall and in sealing relation with said upper and lower ends for filtering foreign material from the flowing air, and an outlet in said cylindrical wall for communicating with the engine intake means whereby air is drawn from said inlet opening through said first and second means to said outlet in said cylindrical wall.

2. In an air filtering device for use with an internal combustion engine or the like having intake means for drawing filtered air from the device and also having suction means for drawing from the device some unfiltered air and foreign material filtered out of the flowing air, the combination of: a generally cylindrical housing having a vertical axis and cylindrical wall, said housing having an upper end and a lower end joined to said wall, the said upper end having an air inlet opening substantially concentric with said housing, first annular means concentrically mounted within said housing for changing the direction of air flow from downwardly from said inlet to radially outwardly and upwardly in said housing whereby foreign material is inertially discharged from the flowing air, said first means including a plurality of vertically spaced annular vane members positioned concentrically with said housing, each vane member having a downwardly and inwardly extending flange portion, an imperforate flow-area restricting plug concentrically mounted in said housing and within said first means, the said lower end of the housing having an annular outlet between said plug and said first means and in communication with said inlet, imperforate means extending downwardly from said annular outlet for defining a pasageway of increasing cross-sectional area for controlled expansion of air therein, said annular outlet being adapted to communicate with the suction means through said passageway whereby the discharged foreign material and some air is drawn from said housing through said outlet and said passageway, second annular means concentrically mounted in said housing between said first means and said cylindrical wall and in sealing relation with said upper and lower ends for filtering foreign material from the flowing air, and an outlet in said cylindrical wall for communicating with the engine intake means whereby air is drawn from said inlet opening through said first and second means to said outlet in said cylindrical wall.

3. In an air filtering device for use with an internal combustion engine or the like having intake means for drawing filtered air from the device and also having suction means for drawing from the device some unfiltered air and foreign material filtered out of the flowing air, the combination of: a generally cylindrical housing having a vertical axis and cylindrical wall, said housing having an upper end and a lower end joined to said wall, the said upper end having an air inlet opening substantially concentric with said housing, annular means concentrically mounted within said housing for changing the direction of air flow from downwardly from said inlet to radially outwardly and upwardly in said housing whereby foreign material is inertially discharged from the flowing air, said annular means including a plurality of vertically spaced annular vane members positioned concentrically with said housing, each vane member having a downwardly and inwardly extending flange, the said lower end of the housing having an annular outlet positioned immediately adjacent and radially inwardly from said vane members and in communication with said inlet, imperforate means extending downwardly from said annular outlet for defining a passageway of increasing cross-sectional area for controlled expansion of air therein, said outlet being adapted to communicate with the suction means through said passageway whereby the discharged foreign material and some air is drawn from said housing through said outlet and said passageway, the said housing having means for sealably receiving an annular replaceable filter element positioned between said annular means and said cylindrical wall and in sealing relation with said upper and lower ends, and an outlet in said cylindrical wall for communicating with the engine intake means whereby air is drawn from said inlet opening through said annular means and the replaceable filter element to said outlet in said cylindrical wall.

4. In an air filtering device for use with an internal combustion engine or the like having intake means for drawing filtered air from the device and also having suction means for drawing from the device some unfiltered air and foreign material filtered out of the flowing air, the combination of: a generally cylindrical housing having a vertical axis and cylindrical wall, said housing having an upper end and a lower end joined to said wall, the said upper end having an air inlet opening substantially concentric with said housing, annular means concentrically mounted within said housing for changing the direction of air flow from downwardly from said inlet to radially outwardly and upwardly in said housing whereby foreign material is inertially discharged from the flowing air, said annular means including a plurality of vertically spaced annular vane members positioned concentrically with said housing, each vane member having a downwardly and inwardly extending flange portion, an imperforate flow-area restricting plug concentrically mounted in said housing and within said annular means, the said lower end of the housing having an annular outlet between said plug and said annular means and in communication with said inlet, imperforate means extending downwardly from said annular outlet for defining a passageway of increasing cross-sectional area for controlled expansion of air therein, said annular outlet being adapted to communicate with the suction means through said passageway whereby the discharged foreign material and some air is drawn from said housing through said outlet and said passageway, the said housing having means for sealably receiving an annular replaceable filter element positioned between said annular means and said cylindrical wall and in sealing relation with said upper and lower ends, and an outlet in said cylindrical wall for communicating with the engine intake means whereby air is drawn from said inlet opening through said annular means and the replaceable filter element to said outlet in said cylindrical wall.

References Cited by the Examiner
UNITED STATES PATENTS

| | | | |
|---|---|---|---|
| 248,760 | 10/81 | Berney | 55—468 |
| 1,463,416 | 7/23 | Adams | 55—431 |
| 1,570,040 | 1/26 | Chandler | 55—431 |
| 2,634,821 | 4/53 | Chipley | 55—319 |
| 2,787,334 | 4/57 | Linderoth. | |
| 3,012,631 | 12/61 | Kaser | 55—323 |

FOREIGN PATENTS

| | | |
|---|---|---|
| 601,883 | 8/34 | Germany. |
| 660,760 | 6/38 | Germany. |
| 564,932 | 10/44 | Great Britain. |
| 284,790 | 12/52 | Switzerland. |

HARRY B. THORNTON, *Primary Examiner.*

HERBERT L. MARTIN, *Examiner.*